(12) United States Patent
Fukumori et al.

(10) Patent No.: US 10,136,665 B2
(45) Date of Patent: Nov. 27, 2018

(54) METHOD FOR PRODUCING QUICK-COOKING RICE AND QUICK-COOKING RICE PRODUCED BY THE METHOD

(75) Inventors: Takeshi Fukumori, Tokyo (JP); Shigeharu Kanemoto, Tokyo (JP); Keishi Wakabayashi, Tokyo (JP)

(73) Assignee: SATAKE CORPORATION, Tokyo (JP)

( * ) Notice: Subject to any disclaimer, the term of this patent is extended or adjusted under 35 U.S.C. 154(b) by 459 days.

(21) Appl. No.: 12/801,513

(22) Filed: Jun. 11, 2010

(65) Prior Publication Data

US 2010/0323087 A1 Dec. 23, 2010

(30) Foreign Application Priority Data

Jun. 18, 2009 (JP) .................................. 2009-145710
Oct. 13, 2009 (JP) .................................. 2009-236359

(51) Int. Cl.
*A23L 7/196* (2016.01)

(52) U.S. Cl.
CPC .................................. *A23L 7/196* (2016.08)

(58) Field of Classification Search
CPC ........ A23L 1/182; A23L 1/1033; A23L 7/196; B02B 1/00
USPC ................ 426/461, 462, 661, 455, 618, 511
See application file for complete search history.

(56) References Cited

U.S. PATENT DOCUMENTS

| | | | |
|---|---|---|---|
| 2,740,719 A * | 4/1956 | Ozai-Durrani ................ 426/627 |
| 2,758,031 A * | 8/1956 | Ozai-Durrani ................ 426/461 |
| 2,828,209 A * | 3/1958 | Hollis, Jr. et al. ............ 426/242 |
| 2,937,946 A * | 5/1960 | Ozai-Durrani ................ 426/417 |
| 4,614,660 A * | 9/1986 | Weibye ................ A23B 7/0053 |
| | | | 426/461 |
| 4,794,012 A | 12/1988 | Taniguchi et al. |
| 5,316,783 A * | 5/1994 | Kratochvil et al. .......... 426/627 |
| 5,820,909 A * | 10/1998 | Hyllstam et al. ............. 426/461 |
| 6,416,802 B1 * | 7/2002 | Lin et al. ...................... 426/238 |

(Continued)

FOREIGN PATENT DOCUMENTS

| | | |
|---|---|---|
| ES | 2 332 686 | 2/2010 |
| JP | 52-120148 | 10/1977 |

(Continued)

OTHER PUBLICATIONS

JP0310849A English abstract and machine translation, May 1991.*

(Continued)

*Primary Examiner* — Subbalakshmi Prakash
(74) *Attorney, Agent, or Firm* — Staas & Halsey LLP

(57) ABSTRACT

Raw material rice (brown rice and partially-milled rice) is subjected to a preliminary pressurized steam-boiling process to form an alpharized layer on the surface of the raw material rice, and then a moisture adding process is performed. Since the surface of the raw material rice is alpharized to become stiff with the preliminary pressurized steam-boiling process, even rapid moisture addition does not cause a crack in the raw material rice. Therefore, water absorption can be quickly achieved to a target moisture content, thereby reducing a moisture adding time. Also, with no crack, quick-cooking rice with an excellent outer appearance of rice as a product and without a drain of nutrients in rice grains at the time of rice cooking.

14 Claims, 10 Drawing Sheets

(56) References Cited

U.S. PATENT DOCUMENTS

| | | |
|---|---|---|
| 7,357,954 B2 | 4/2008 | Kanemoto et al. |
| 2001/0006696 A1* | 7/2001 | Lee et al. ................. 426/625 |
| 2004/0126476 A1 | 7/2004 | Kanemoto et al. |
| 2008/0220145 A1* | 9/2008 | Fukumori et al. ............ 426/627 |

FOREIGN PATENT DOCUMENTS

| | | |
|---|---|---|
| JP | 59-85263 | 5/1984 |
| JP | 61-81756 | 4/1986 |
| JP | 61-247348 | 11/1986 |
| JP | 62-181746 | 8/1987 |
| JP | 03108459 A * | 5/1991 |
| JP | 3-130044 | 6/1991 |
| JP | 2004-159561 | 6/2004 |
| JP | 2007-111044 | 5/2007 |
| JP | 4099036 | 6/2008 |
| JP | 2008-220221 | 9/2008 |
| JP | 2009-27950 | 2/2009 |

OTHER PUBLICATIONS

Spanish Office Action for corresponding Spanish Application 2010030882; dated Oct. 21, 2011.
Japanese Notification of Reasons for Refusal drafted Sep. 30, 2013 in Japanese Patent Application No. 2009-236359.

* cited by examiner

STEP 9
(FINISH MILLING PROCESS)

METHOD FOR PRODUCING QUICK-COOKING RICE AND QUICK-COOKING RICE PRODUCED BY THE METHOD

BACKGROUND OF THE INVENTION

1. Field of the Invention

The present invention relates to a method of producing quick-cooking rice mainly from long-grain and medium-grain rice as raw material rice (brown rice, partially-milled rice), and the quick-cooking rice produced by the method.

2. Description of Related Art

Conventionally, there is quick-cooking rice that can be returned to the cooked state within a short period of time by adding water or boiled water. Examples of quick-cooking rice include parboiled rice and instant rice. Parboiled rice is widely consumed in America and Europe as well as Asian countries, such as India and Pakistan. Parboiled rice is produced by steam-boiling (alpharizing) raw material unhulled rice, and the rice is then dried, hulled, and milled. When prepared for consumption, it is boiled in water for approximately 10 minutes. Since parboiled rice is produced by steam-boiling raw material unhulled rice as it is in the producing process, the chaff odor and others seep into the endosperm, thereby providing a branny flavor.

In recent years, consumer preferences with respect to the taste of parboiled rice have diversified, and the number of consumers who dislike the branny flavor of parboiled rice has increased. To get around this problem, parboiled rice without a smell of bran has been developed. Examples of a method of producing parboiled rice include those disclosed in Japanese Unexamined Patent Application Publication Nos. 2008-220221 and 2009-27950. In the producing method disclosed in these gazettes, brown rice is used as a raw material. After being partially milled, the brown rice is subjected to a moisture adding process by spraying or humidification and air draft, a moisture conditioning process, and then a normal-pressure steam-boiling and a pressurized steam-boiling process for alpharization of the rice grains. Then, after a cooling process, a finish milling process, and a drying process, parboiled rice (product) is produced. According to this producing method, since the raw material brown rice is steam-boiled, parboiled rice without a branny flavor can be obtained.

However, in this method of producing parboiled rice, when raw material rice is subjected to a moisture adding process, cracks may occur on the surface of rice grains if the moisture addition speed is increased. Therefore, the moisture addition speed is made slow (sluggish) to prevent the occurrence of cracks associated with addition of moisture (moisture addition speed: 0.5%/h to 0.8%/h). For this reason, in the moisture adding process, a long time is disadvantageously required for addition of moisture.

Instant rice has a particularly short cooking time among quick-cooking rice, for example, approximately five minutes to ten minutes for cooking. An example of a method of producing instance rice is disclosed in, for example, Japanese Patent No. 4099036. In this producing method, partially-milled rice as a raw material is sequentially subject to primary soaking, and then primary alpharization (normal-pressure steam-boiling), preliminary drying, finish milling (high-moisture milling), secondary soaking, secondary alpharization (normal-pressure steam-boiling), single granulation, and finish drying.

However, in the method of producing parboiled rice described above, when raw material rice is subjected to a moisture adding process, cracks may occur on the surface of rice grains if the moisture addition speed is increased. Therefore, the moisture addition speed is made slow (sluggish) to prevent the occurrence of cracks associated with addition of moisture (moisture addition speed: 0.5%/h to 0.8%/h). For this reason, in the moisture adding process, a long time is disadvantageously required for addition of moisture. Also in the method of producing instant rice described above, as with the case of parboiled rice, raw material rice in a raw state is soaked into water in a soak tank in the moisture adding process. Unless a long time is taken for this moisture adding process, cracks may occur on the surface of rice grains. Therefore, the moisture adding process requires a long time.

Moreover, in the method of producing instant rice described above, raw material rice grains are soaked into warm water (at approximately 80 degrees Celsius) in a soak tank in the processes of primary and secondary soaking, and therefore a large amount of warm water is used. For this reason, a drainage facility for processing warm water after soaking is required, thereby disadvantageously increasing cost of a production facility.

In both of the method of producing parboiled rice and the method of producing instant rice, when the rice grains of the raw material rice with cracks occurring in the moisture adding process are alpharized in a subsequent alpharizing process or the like, the cracks on the surface of the rice grains may be in a torn state to let nutrients inside the rice grains elute. Also, the shape of the rice grains may be destroyed to degrade the outer appearance of the product.

In view of the problems described above, a technical object of the present invention is to provide a method of producing quick-cooking rice capable of preventing cracks in rice grains in a moisture adding process and also reducing time required for the moisture adding process.

Another problem to be solved is to provide a method of producing quick-cooking rice without requiring a drainage facility.

SUMMARY OF THE INVENTION

The present invention provides, as producing methods, a producing method common to quick-cooking rice, and its specific examples, that is, a method of producing parboiled rice and a method of producing instant rice. The present invention also provides, as products, quick-cooking rice, parboiled rice and instant rice produced by these producing methods.

The Producing Method Common to Quick-Cooking Rice

The producing method common to quick-cooking rice is configured as follows.

The method is provided sequentially with:

a preliminary pressurized steam-boiling step of steam-boiling raw material rice with pressurized steam;

a moisture adding step of adding moisture to rice grains with spraying means, the rice grains discharged in the preliminary pressurized steam-boiling step;

a finish pressurized steam-boiling step of steam-boiling the rice grains discharged in the moisture adding step with pressurized steam;

a drying step of drying the rice grains discharged in the finish pressurized steam-boiling step; and a finish milling step of finish-milling the rice grains discharged in the drying step.

In the producing method, the preliminary pressurized steam-boiling process is performed to form an alpharized layer on the surface of the raw material rice, and then the moisture adding process is performed. Therefore, the surface of the raw material rice becomes stiff with the alpharized layer. With this, even a rapid moisture addition speed, cracks do not occur, and moisture can be absorbed to a target moisture content. As a result, the moisture adding time can be shortened. Also, even with a rapid moisture adding process, cracks do not occur, and the quality of the rice grains is prevented from being degraded with such cracks and others.

Furthermore, when pressurized steam-boiling is performed with saturated steam at a temperature equal to or higher than 100 degrees Celsius, drainage water at the time of steam boiling can be suppressed to an extremely small amount, such as drainage due to steam condensation. Furthermore, the moisture adding means is of a spray type, thereby suppressing waste of water flowing without being absorbed into the rice grains.

In the moisture adding step, moisture may be added to the rice grains at a moisture addition speed of 20%/h to 80%/h.

The preliminary pressurized steam-boiling step may be performed with a pressurized state of 0.1 MPa to 0.3 MPa for 120 seconds to 300 seconds.

In the moisture adding step, moisture may be added to the rice grains to a moisture content of 20% to 28%.

The finish pressurized steam-boiling process may be performed with a pressurized state of 0.1 MPa to 0.3 MPa for 120 seconds to 600 seconds.

As a step preceding the preliminary pressurized steam-boiling step and/or the finish pressurized steam-boiling step, a normal-pressure steam-boiling step of heating the rice grains with steam at normal pressure may be provided.

Method of Producing Parboiled Rice

The method of producing parboiled rice includes, in addition to the steps of the producing method common to quick-cooking rice, a moisture conditioning step, such as tempering, provided next to the moisture adding step. After moisture distribution in the rice grains is made constant, the procedure goes to the finish pressurized steam-boiling step.

As a step subsequent to the finish pressurized steam-boiling step, a cooling step of reducing at least heat on each surface of the rice grains discharged in the finish pressurized steam-boiling step may be provided.

Method of Producing Instant Rice

The method of producing instant rice includes, in addition to the steps of the producing method common to quick-cooking rice, after the finish milling step, a quantitative moisture adding step of letting the rice grains absorb a predetermined quantity of moisture, a puffing and drying step of overheating and drying the rice grains, and a finish drying step of further heating and drying the rice grains.

Since the alpharized layer on the surface of the raw material rice is formed not by steam-boiling at normal pressure but by pressurized steam-boiling, pressure steam-boiling can be achieved in a manner such that pressure is applied to the surface of the rice grains from all circumferential directions. Such pressure steam-boiling uniformly alpharizes the surface of the rice grains, the finished quick-cooking rice has an excellent outer appearance without cracks.

DETAILED DESCRIPTION

Figure 1:
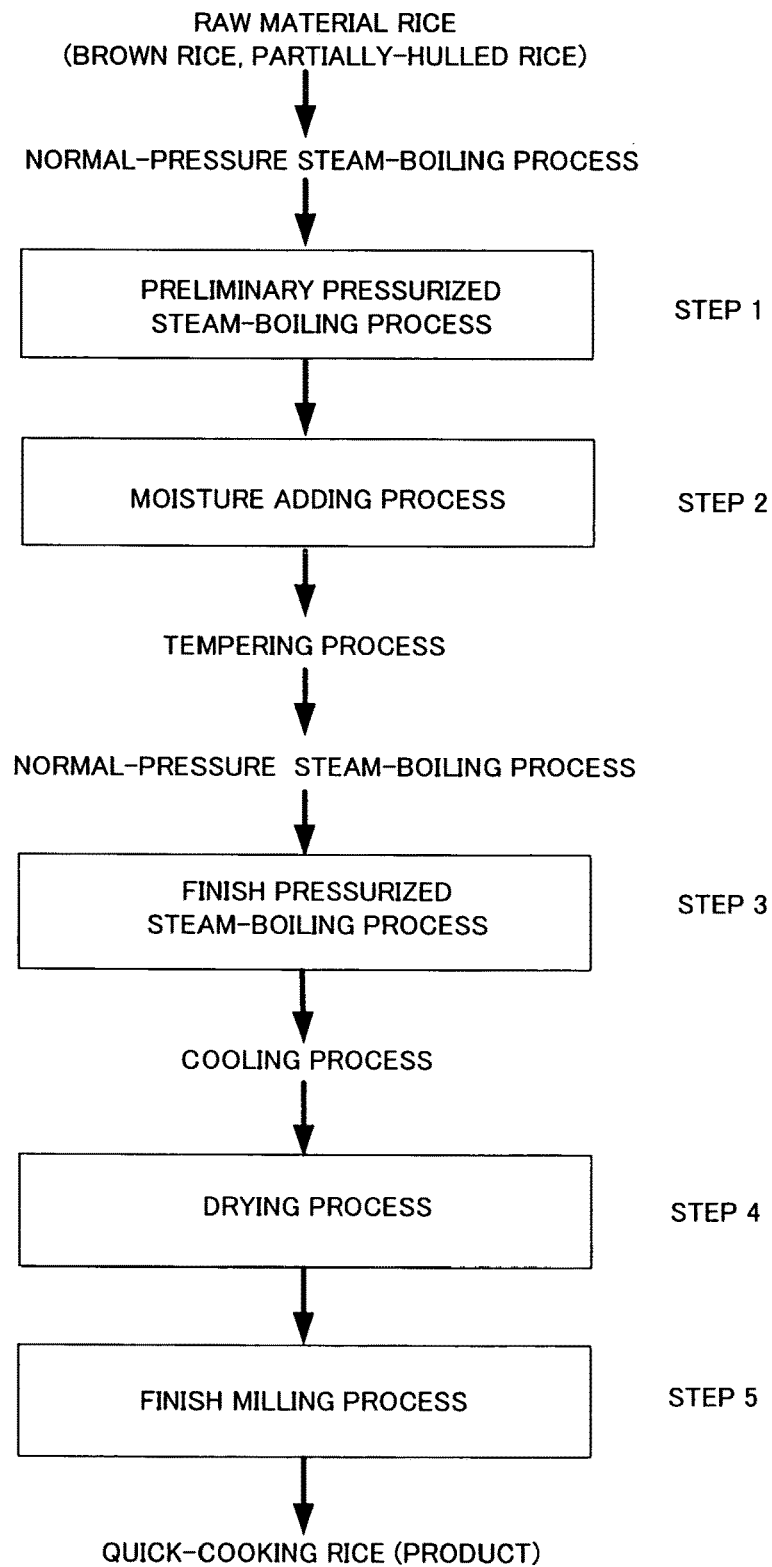
FIG. 1 is a production flowchart of a method of producing quick-cooking rice according to the present invention.

FIG. 1 is a production flowchart of a method of producing quick-cooking rice.

Quick-cooking rice production has basic processes including a preliminary pressurized steam-boiling process (step 1) of steam-boiling raw material rice with pressurized steam; a moisture adding process (step 2) of adding moisture to rice grains with spraying means, the rice grains discharged in the preliminary pressurized steam-boiling process; a finish pressurized steam-boiling process (step 3) of steam-boiling the rice grains discharged in the moisture adding process with pressurized steam; a drying process (step 4) of drying the rice grains discharged in the finish pressurized steam-boiling process; and a finish milling process (step 5) of finish-milling the rice grains discharged in the drying process.

Before the preliminary pressurized steam-boiling process or the finish pressurized steam-boiling process, a normal-pressure steam-boiling process may be provided to increase the temperature of the rice grain, thereby facilitating the pressurized steam-boiling process. After the moisture adding process, a tempering process may be placed so as to equally diffuse moisture into the rice grains. The rice grains after the finish pressurized steam-boiling process are cooled, and then subjected to be the drying process before the finish milling process.

A first feature of the producing method is to steam-boil rice grains in a steam-boiling process, such as the preliminary pressurized steam-boiling process (step 1) or the finish pressurized steam-boiling process (step 3). With pressurized steam-boiling, the surface of the rice grains can be uniformly alpharized from the entire circumferential surface. Also, use of a large amount of boiling water is not required, thereby presenting no problem of a drainage process. A second feature is that the steam-boiling process is provided before the moisture adding process. This can prevent cracks from occurring in the raw material rice in the moisture adding stage. With no occurrence of cracks, the outer appearance of quick-cooking rice as a product is improved. Also, in cooking, drain of nutrients can be prevented. A third feature is that, in the moisture adding process, moisture is added with the spraying means, thereby eliminating waste of water flowing without being absorbed into the rice grains.

Since the method of producing quick-cooking rice includes basic steps of the method of producing parboiled rice and the method of producing instant rice, details will become apparent in the following description of the method of producing parboiled rice (first embodiment) and the method of producing instant rice (second embodiment).

Method of Producing Parboiled-Rice (First Embodiment)

Figure 2:
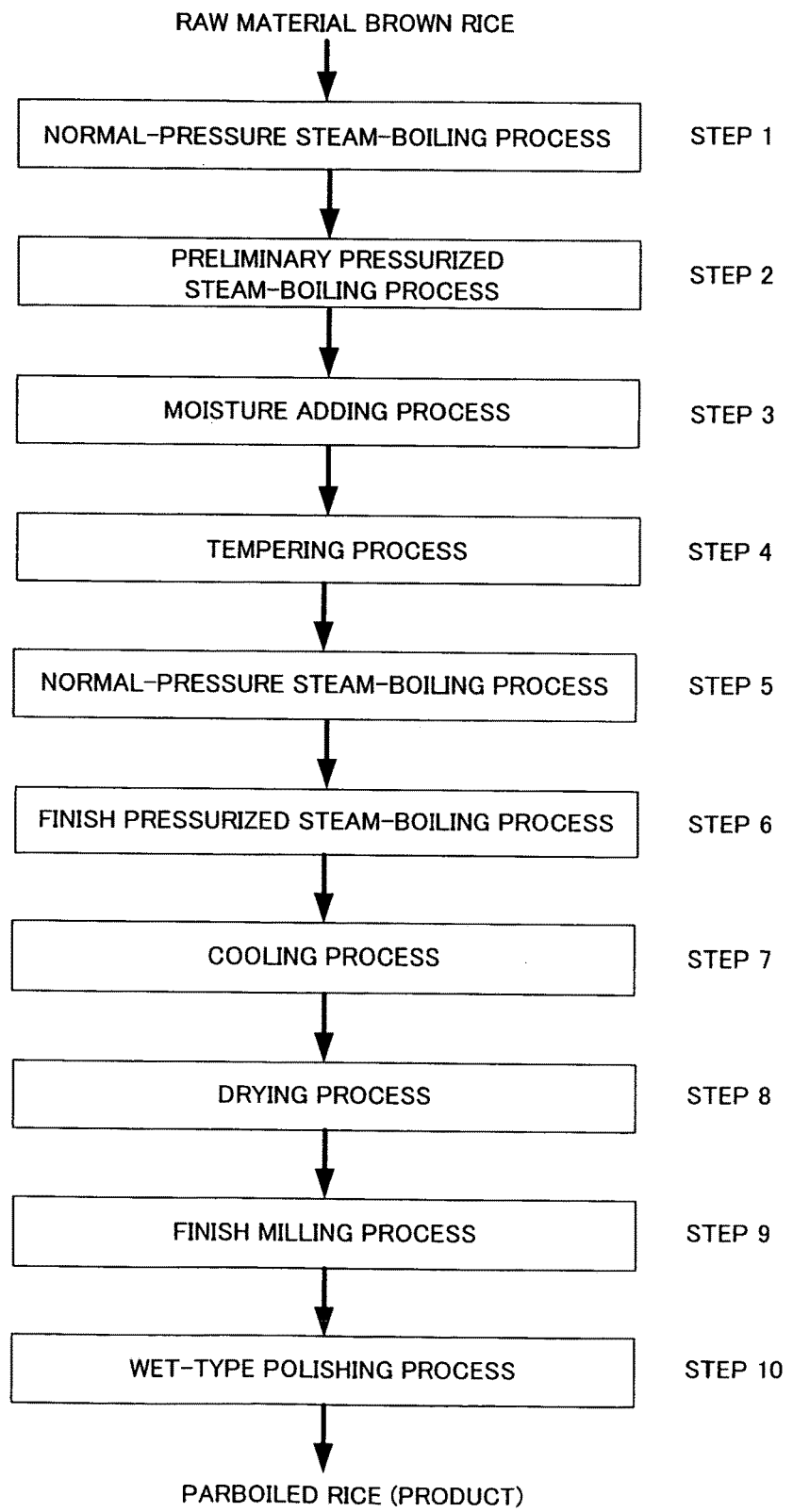
FIG. 2 is a production flowchart of a method of producing parboiled rice according to the present invention.

FIG. 2 is a flow of producing parboiled rice in the present invention.

Long-grain or medium-grain brown rice is used as a raw material.

Step 1 (Normal-Pressure Steam-Boiling Process)

Figure 4:
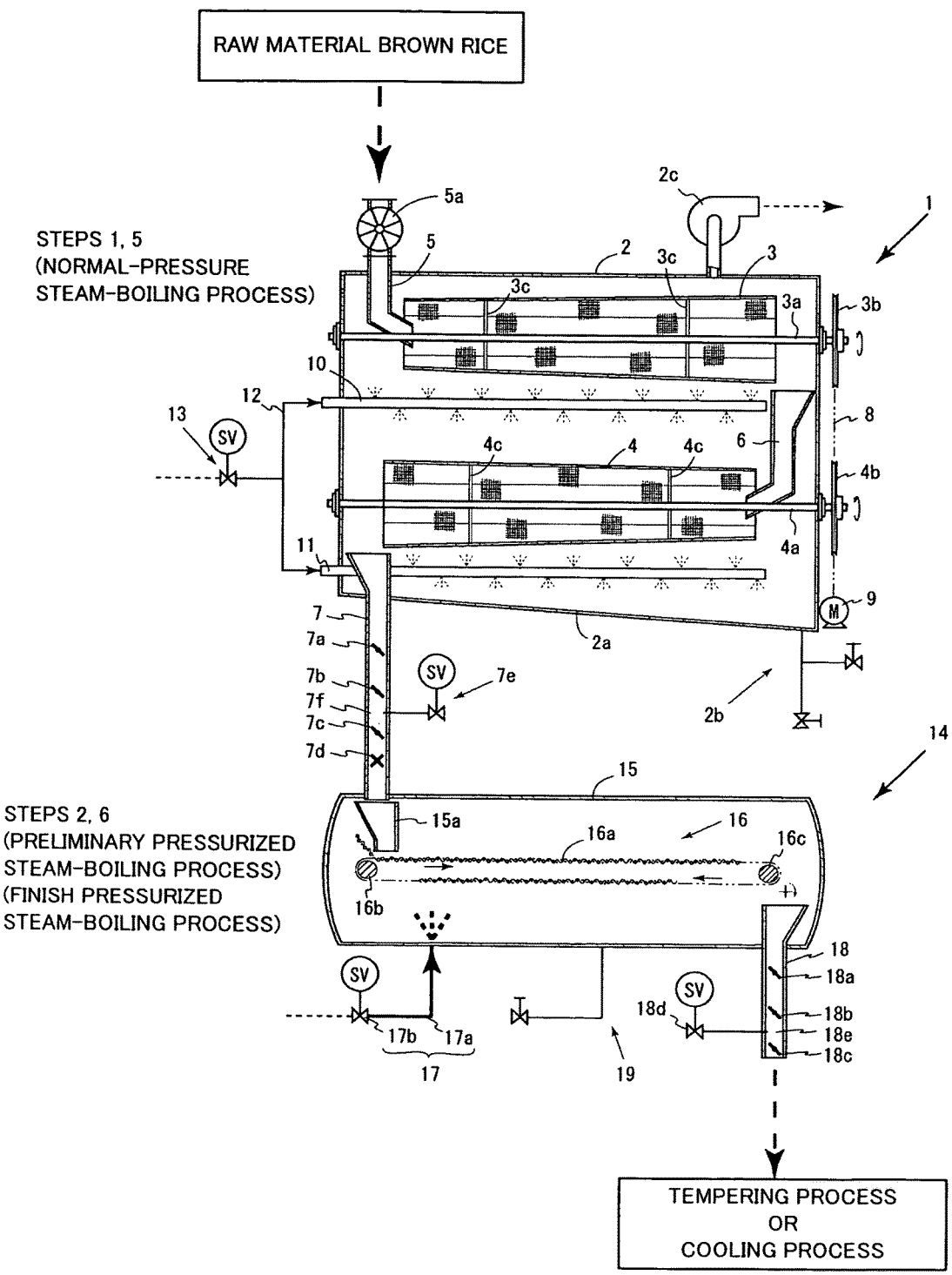
FIG. 4 is a longitudinal section view of a normal-pressure steam-boiling apparatus and a pressurized steam-boiling apparatus in the present invention.

This process is a normal-pressure steam-boiling process in which raw material brown rice is steam-boiled in a state at normal pressure to be heated (preliminarily heated) in preparation for the next process. FIG. 4 depicts a normal-pressure steam-boiling apparatus 1 for use in the normal-pressure steam-boiling process. The normal-pressure steam-boiling apparatus 1 has the inside enclosed with a machine wall 2 where rotary drums 3 and 4 each in a cylindrical, polygonal shape with a porous wall are disposed in a horizontal orientation so that they have a vertical relation with each other. The upper horizontally-oriented rotary drum 3 is disposed so as to be tilted downward from a supply side at one end to a discharge side at the other end for downflow of a raw material. In the supply side at one end of the rotary drum 3, a discharge side of a raw-material supply pipe 5 is inserted. The discharge side at the other end has a downward transport pipe 6 for transporting and supplying the raw material discharged from the rotary drum 3 to a supply side at one end of the lower horizontally-oriented rotary drum 4 for communication.

As with the rotary drum 3, the rotary drum 4 is disposed so as to be tilted downward from the supply side at one end to a discharge side at the other end for downflow of the raw material. In the supply side at one end, a discharge side of a downward transport pipe 6 is inserted. The discharge side at the other end has a downward transport pipe 7 for transporting and supplying the raw material to the next process (preliminary pressurized steam-boiling process, step 2) for communication. The rotary drums 3 and 4 have rotary shafts 3a and 4a, respectively, horizontally oriented at the center inside, and also includes coupling plates 3c and 4c for communicating the rotary shafts 3a and 4a, respectively, with the inner walls of the respective rotary drums. With bearings of the rotary shafts 3a and 4a provided on the machine wall 2, the rotary drums 3 and 4 can freely rotate. The rotary shafts 3a and 4a each have one end connected via pulleys 3b and 4b, respectively, and a motive power transfer belt 8 to a motor 9.

Below each of the rotary drums 3 and 4, steam discharge pipes 10 and 11 having a length throughout the length of each of the rotary drums 3 and 4, respectively, are disposed in a horizontal orientation. A steam supply source side of each of the steam discharge pipes 10 and 11 is connected via a steam pipe 12 and an on-off valve 13 to a steam supply source (not shown). A bottom section 2a of the machine wall 2 is disposed so as to be tilted downward toward one side. At a lower portion of the tilt, a drain section 2b is provided for drainage of steam accumulated as water drops at the bottom of the machine wall 2. On an upper supply side of the raw-material supply pipe 5, a feed valve 5a is provided.

Although the rotational speeds of the rotary drums 3 and 4 are not particularly restrictive, they are set as appropriate so that the time for the raw material to pass through the rotary drums 3 and 4 falls within a range of 10 seconds to 300 seconds so as to prevent cracking. Also to prevent cracking when steam is supplied from the steam discharge pipe 10 to fill the inside of the machine wall 2, the amount of steam is set as appropriate.

The operation of step 1 (normal-pressure steam-boiling process) is described.

In the normal-pressure steam-boiling process, the above-structured normal-pressure steam-boiling apparatus 1 is used to supply saturated vapor at approximately 100 degrees Celsius from the steam discharge pipe 10 to fill the inside of the machine wall 2 of the normal-pressure steam-boiling apparatus 1 at a normal-pressure state. Also, while the rotary drums 3 and 4 are being rotated, one lot of a raw material (brown rice) is supplied to the supply side at one end of the rotary drum 3 via the feed valve 5a and the raw-material supply pipe 5.

The raw material supplied into the rotary drum 3 is covered with steam (saturated vapor) in a normal-pressure state. Then, air between grains of the raw material is expelled by this steam, and steam fills the clearance between the grains to heat the raw material. At this time, the raw material downflows toward the discharge side at the other end as being agitated by the rotation of the rotary drum 3. Air between the grains is discharged from an air exhausting section 2c formed of a discharge pipe and an air-discharge fan provided on an upper portion of the machine wall 2. After the raw material passing through the rotary drum 3 is discharged from the discharge side at the other end, the raw material passes through the downward transport pipe 6 to be supplied into the rotary drum 4. In the rotary drum 4, as with the operation of the rotary drum 3, the raw material is heated while being agitated and transported and then discharged from the discharge side at the other end. The normal-pressure steam-boiling time from charging brown rice to discharging is preferably within approximately one minute so as to prevent cracks in the rice grains. In this manner, while the raw material is preliminarily heated at approximately 100 degrees Celsius without the occurrence of cracking, saturated steam is provided to fill the clearance between the rice grains in preparation for the next pressurized steam-boiling process to expel air. The raw material discharged from the discharge side at the other end of the rotary drum 4 is sent via the downward transport pipe 7 to the preliminary pressurized steam-boiling process (step 2). In the normal-pressure steam-boiling process, steam is used, and therefore the amount of water used is small, and the amount of drainage from the drain section 2b is also small.

Note that the process at this step 1 (normal-pressure steam-boiling process) is not indispensable in the present invention. However, with step 1 provided, production efficiency in time is improved, and uniform and high-quality product (parboiled brown rice) can be produced.

Step 2 (Preliminary Pressurized Steam-Boiling Process)

In this preliminary pressurized steam-boiling process, the surface layer of the raw material discharged in the preceding normal-pressure steam-boiling process (from the normal-pressure steam-boiling apparatus 1) is alpharized. FIG. 4 depicts a pressurized steam-boiling apparatus 14 for use in the preliminary pressurized steam-boiling process. The pressurized steam-boiling apparatus 14 has the inside enclosed with a machine wall 15 where a belt conveyor 16 is disposed in a horizontal orientation. The belt conveyor 16 includes a net-type conveyor endless belt 16a, and a driving roller 16b and a driven roller 16c between which the conveyor endless belt 16a runs. At the bottom of the machine wall 15, a pressurized and heated steam supply section 17 is disposed in an enclosed space formed by the machine wall 15 to supply pressurized and heated steam. The pressurized and heated steam supply section 17 includes a pressurized and heated steam supply source (not shown) and a steam pipe 17a for supplying the pressurized and heated steam generated by the pressurized and heated steam supply source to a supply port (not shown) provided at the bottom of the machine wall 15. At some midpoint of the steam pipe 17a, an on-off valve 17b is disposed.

On a conveyor start end side of the belt conveyor 16, a tilted shoot pipe 15a is disposed to supply the rice grains (raw material) from the preceding process onto the belt conveyor 16. Also, an upstream side end of the tilted shoot pipe 15a communicates with the discharge side of the downward transport pipe 7 to receive the rice grains (brown rice) discharged at the preceding step 1 (normal-pressure steam-boiling process) into this step 2 (preliminary pressurized steam-boiling process).

Inside of the downward transport pipe 7, a plurality of valves are incorporated so as to prevent pressurized and heated steam in the machine wall 15 from exiting outside when receiving supply of the raw material from step 1. The plurality of valves are such that a shock absorbing damper 7a that absorbs shock of the falling raw material, an upper butterfly valve 7b, a lower butterfly valve 7c, and a loosing plate 7d that looses a lump of the raw material supplied from the preceding process are disposed inside the downward transport pipe 7 sequentially from top so as to be spaced a predetermined distance apart from each other. In a gap 7f between the upper butterfly valve 7b and the lower butterfly valve 7c in the downward transport pipe 7, an air discharge valve 7e is provided.

The operation of the plurality of valves in the downward transport pipe 7 is described. When the raw material is supplied via the downward transport pipe 7 to the pressurized steam-boiling apparatus 14, the upper butterfly valve 7b and the lower butterfly valve 7c are first both set to be in a closed state to release pressure (pressurized and heated steam) in the gap 7f from the air discharge valve 7e. Then, the upper butterfly valve 7b is set to be in an open state, the raw material is supplied from an upper supply side into the gap 7f while the amount of flow is being adjusted based on the degree of opening of the shock absorbing damper 7a. Then, when a predetermined amount of raw material is accumulated in the gap 7f, the air discharge valve 7e is set to be in a closed state, and the upper butterfly valve 7b is set to be in a closed state. Then, the lower butterfly valve 7c is set to be in an open state. With this, the raw material falls under its own weight to be supplied via the loosing plate 7d to the pressurized steam-boiling apparatus 14 (inside the tilted shoot pipe 15a). With this sequence being repeated, one lot of the raw material is sequentially supplied into the pressurized steam-boiling apparatus 14.

On a conveyor termination end side of the belt conveyor 16, a downward transport pipe 18 is disposed to discharge the brown rice having the surface layer of the rice grains alpharized in the pressurized steam-boiling apparatus 14 to outside of the machine wall 15. Also inside of the downward transport pipe 18, a plurality of valves are disposed, as with the downward transport pipe 7, so as to prevent pressurized and heated steam in the pressurized steam-boiling apparatus 14 from exiting outside to decrease the pressure in the machine wall 15 when discharging the alpharized rice grains to the outside of the machine wall 15. The plurality of valves are such that a shock absorbing damper 18a that absorbs falling shock when the brown rice processed in the pressurized steam-boiling apparatus 14 is discharged to fall, an upper butterfly valve 18b, and a lower butterfly valve 18c are disposed inside the downward transport pipe 18 sequentially from top to bottom so as to be spaced a predetermined distance apart from each other. In a gap 18e between the upper butterfly valve 18b and the lower butterfly valve 18c in the downward transport pipe 18, an air discharge valve 18d is provided. At the bottom of the machine wall 15, a drain section 19 is provided for drainage of steam accumulated as water drops in the pressurized steam-boiling apparatus 14.

The operation of the plurality of valves in the downward transport pipe 18 is described. When the alpharized brown rice is discharged via the downward transport pipe 18 from the pressurized steam-boiling apparatus 14, the upper butterfly valve 18b and the lower butterfly valve 18c are first both set to be in a closed state to release pressure (pressurized and heated steam) in the gap 18e from the air discharge valve 18d. Then, the upper butterfly valve 18b is set to be in an open state, the brown rice to be discharged is supplied into the gap 18e while the amount of flow is being adjusted by adjusting the degree of opening of the shock absorbing damper 18a. Then, when a predetermined amount of brown rice is accumulated in the gap 18e, the air discharge valve 18d is set to be in a closed state, and the upper butterfly valve 18b is set to be in a closed state, and the lower butterfly valve 18c is set to be in an open state. With this, the brown rice falls under its own weight to be discharged outside. With this sequence being repeated, one lot of processed brown rice is sequentially discharged outside the pressurized steam-boiling apparatus 14.

The operation of step 2 (preliminary pressurized steam-boiling process) is described.

First, saturated steam pressurized from the pressurized and heated steam supply section 17 into the machine wall 15 of the pressurized steam-boiling apparatus 14, and the pressure in the machine wall 15 is adjusted to have an arbitrary set value within a range of 0.1 MPa to 0.3 MPa. The temperature in the machine wall 15 when the pressure in the machine wall 15 becomes 0.1 MPa to 0.3 MPa is approximately 120 degrees Celsius to 145 degrees Celsius. Next, the brown rice preliminarily heated at the preceding process (step 1, normal-pressure steam-boiling process) is supplied to a conveyor start end side of the belt conveyor 16. The time for pressurized steam-boiling of the supplied brown rice is preferably within a range of 120 seconds to 300 seconds, and the conveyance speed of the belt conveyor 16 is adjusted so that the time has an arbitrary set value within the time range mentioned above. Since the supplied brown rice is preliminarily heated, no heating time is required, and therefore the process can be performed within a short period of time, as with the pressurized steam-boiling process time. Under such conditions, the brown rice is subjected to a pressurized steam-boiling process under a pressurized state of 0.1 MPa to 0.3 MPa (temperature: approximately 120 degrees Celsius to 145 degrees Celsius) for 120 seconds to 300 seconds. With this, the surface layer of the brown rice is alpharized (approximately 10% to 20%), and then the brown rice is discharged from the downward transport pipe 18. Alpharization of the surface layer of the brown rice depends on the set value within the ranges of the pressurized state and the pressurized steam-boiling time. Within the ranges, when the pressure is high and the processing time is long, the degree of alpharization is large (more). Conversely, when the pressure is low and the processing time is short, the degree of alpharization is small (less). Here, since steam is used in the preliminary pressurized steam-boiling process, the amount of water used is small, and the amount of drainage from the drain section 19 is also small.

In this manner, pressurized steam-boiling the brown rice has an advantage such that each grain of brown rice can be uniformly subjected to pressurized steam-boiling from all circumferential directions with saturated steam smoothly filling the clearance between the grains by the pressure even when the grains of the brown rice are in contact with each other, thereby making the state of alpharization of the surface layer of each grain of brown rice uniform and decreasing unevenness. This prevents moisture-addition (hydrous) nonuniformity among the grains of brown rice and in a single grain of brown rice, in a subsequent moisture adding process (step 3), which is effective for producing parboiled brown rice with higher quality.

Step 3 (Moisture Adding Process) and Step 4 (Tempering Process)

Figure 5:
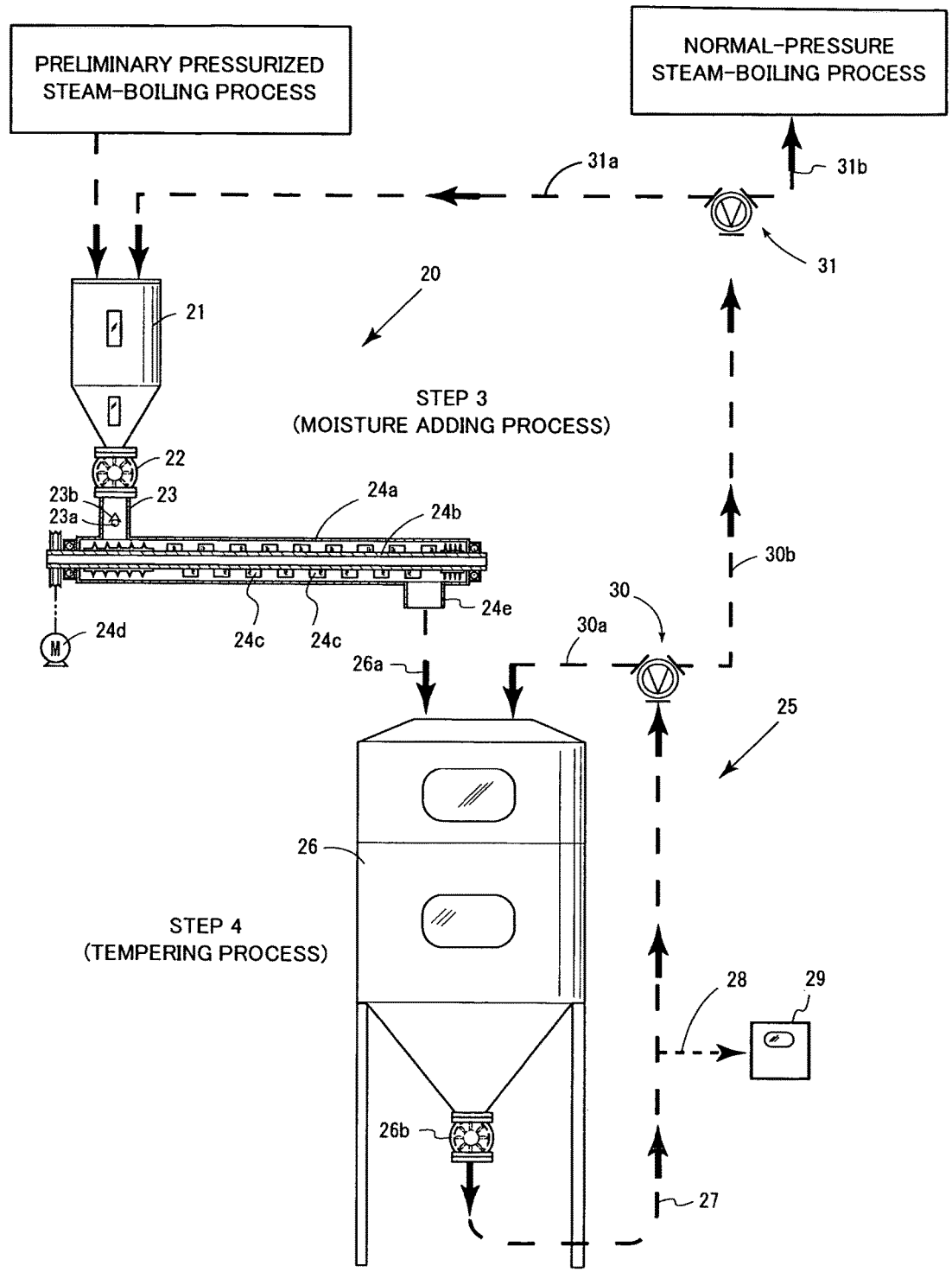
FIG. 5 is a diagram of a moisture adding apparatus and a tempering apparatus in the present invention.

In these moisture adding process and tempering process, the brown rice discharged in the preceding preliminary pressurized steam-boiling process (from the pressurized steam-boiling apparatus 14) with the alpharized surface layer is subjected to moisture adding and conditioning (tempering) up to a predetermined moisture value. FIG. 5 depicts a moisture adding apparatus 20 for use in the moisture adding process and a tempering apparatus 25 for use in the tempering process.

Structure of Moisture Adding Apparatus 20

As the moisture adding apparatus 20, no special moisture adding apparatus is required and, for example, a moisture adding apparatus as depicted in FIG. 5 may suffice. The moisture adding apparatus 20 includes a supply tank 21 for accumulating the brown rice with the surface layer alpharized in the preceding process (step 2, preliminary pressurized steam-boiling process). A discharge side of the supply tank 21 is connected via a feed valve (rotary valve) 22 to a raw material supply pipe path 23. A discharge side of the raw material supply pipe path 23 is connected to a supply side of an agitator transport section 24, which is described below. Inside of the supply pipe path 23, a shower spray nozzle 23a for spraying water to add moisture to the brown rice like a shower is provided. On an upper portion of the shower spray nozzle 23a, a rice-grain downflow regulation plate 23b in an umbrella shape is disposed. The agitator transport section 24 has an agitator barrel 24a as a machine wall disposed in a horizontal orientation. To a supply side of the agitator barrel 24a, the supply pipe path 23 is connected. To a discharge side thereof, a discharge section 24e is provided. Inside of the agitator barrel 24a, an agitator transport shaft 24b rotatable by bearings provided at left and right ends is incorporated. On the agitator transport shaft 24b, agitator transport vanes 24c that provides the brown rice with an agitating operation and a transport operation are disposed so as to be equally spaced apart from each other along a longitudinal direction. One end side of the agitator transport shaft 24b is connected to a motor 24d via a pulley and a motive power transfer belt. The shower spray nozzle 23a is connected to a water pressure supply section (not shown) to allow the amount of spray to be adjusted.

Structure of Tempering Apparatus 25

The tempering apparatus 25 includes an isothermal cylindrical tank section 26. An upper supply port of the tank section 26 connects the discharge section 24e of the moisture adding apparatus 20 and a flow path 26a. On the other hand, at a lower discharge port of the tank section 26, a rotary valve 26b is provided, which includes a reflow section 27 for causing a reflow of the moisture-added brown rice discharged from the rotary valve 26b into the tank section 26. As the reflow section 27, a known bucket-type lift or a pressurized-air conveyor apparatus may be used. A reflow route of the reflow section 27 is provided with arbitrary sample collecting means (for example, a sample collecting route) 28 for collecting a sample of the moisture-added brown rice. To the sample collecting means 28, a known grain moisture meter 29 is connected. With this, the moisture content of the brown rice passing through the reflow route is measured anytime.

On a discharge side of the reflow section 27, a flow-path switching valve 30 is provided, thereby allowing switching between a flow path 30a on a side of reflow to the tank section 26 and a flow path 30b on a side toward the moisture adding apparatus 20 or the next process (normal-pressure steam-boiling process, step 5). Furthermore, on a downstream side of the flow path 30b, a flow-path switching valve 31 is provided, thereby allowing switching between a flow path 31a reflowing to a supply tank of the moisture adding apparatus 20 and a flow path 31b toward the next process (normal-pressure steam-boiling process, step 5).

The operation of step 3 (moisture adding process) is described.

The brown rice with the surface layer alpharized in the preceding process (step 2, preliminary pressurized steam-boiling process) is sequentially fed from the supply tank 21 with the rotation of the rotary valve 22. When flowing down through the raw material supply pipe path 23, the brown rice is showered with quantitative shower water from the shower spray nozzle 23a for supply into the agitator barrel 24a. The brown rice supplied into the agitator barrel 24a receives a rotating operation of agitating means 24d formed of the agitator transport shaft 24b and the agitator transport vanes 24c to be transported as being agitated with shower water for discharge from the discharge section 24e. In this manner, when the brown rice is agitated and transported to the agitator barrel 24a, the surface layer of the brown rice is uniformly alpharized, and therefore the surface layer has elastic stiffness. Therefore, even the brown rice is mixed with shower water, moisture is added from the entire surface of the rice grains to the inside without causing cracks on the surface of the rice grains. Also, the amount of water for addition mixed with the brown rice is set to be sufficient so as to prevent superfluous water (drainage) as much as possible. With this, the speed of moisture absorption into the brown rice is increased, the moisture adding time for achieving a target moisture-addition value (target moisture content) of 20% to 28% can be reduced. At this time, since the surface layer of the brown rice is uniformly alpharized, moisture can be added from the entire surface of the brown rice to the inside without causing cracks on the surface of the brown rice.

The moisture addition speed in the present invention is within a range of 20%/h to 80%/h. Within this range, moisture can be absorbed to the target moisture content without causing cracks on the surface of the rice grains. Here, as the degree of alpharization of the surface layer of the brown rice is larger (more), the acceleration speed becomes near 80%/h. Conversely, as the degree of alpharization is smaller (less) the acceleration speed becomes near 20%/h. The degree of alpharization of the surface layer of the brown rice is adjusted at step 2 (preliminary pressurized steam-boiling process) as described above. Here, in the present invention, the amount of moisture to be added and mixed with the brown rice is adjusted so as to prevent superfluous water as much as possible in the moisture adding process, thereby simplifying a production facility and reducing equipment investment cost without requiring a facility for drainage.

The operation of step 4 (tempering process) is described.

At this step 4, one lot of the brown rice moisture-added in the preceding process (step 3, moisture adding process) is first supplied and deposited in the tank section 26 in the tempering apparatus 25 via the flow path 26a. After deposition of one lot of the brown rice is completed, the brown rice in the tank section 26 is fed sequentially from the bottom of deposition by driving the rotary valve 26b and the reflow section 27 to reflow, and is conditioned in the tank section 26. In this circulation, a sample of partially-milled brown rice after moisture addition is collected by the sample collecting means 28 and is sent to the grain moisture meter 29 for measurement of the moisture content of the brown rice sample. When the measured moisture content reaches an insufficient level lower than the target moisture content, which is described below, the brown rice is caused to reflow into the moisture adding apparatus 20 again via the flow-path switching valves 30 and 31, and is accumulated in the tempering apparatus 25 and again conditioned so that the moisture content is near the target moisture content and nonuniformity among the rice grains is reduced.

In the tempering process, uniformity among the rice grains is achieved by eliminating nonuniformity thereamong within the range of 20% to 28% of the moisture content of the moisture-added brown rice so that the moisture content becomes an arbitrarily-set target moisture content. The time for the tempering process is set as appropriate within a range of approximately 30 minutes to 120 minutes. Here, the temperature in the tank section 26 is preferably within a range of 50 degrees Celsius to 70 degrees Celsius. Here, with the tempering process, nutrients, such as mineral, contained in the bran layer or germ of the brown rice move to the endosperm portion. Therefore, even when the brown rice is eventually milled to become a product, the nutrients can be kept in the rice grains.

Step 5 (Normal-Pressure Steam-Boiling Process)

In the process of normal-pressure steam-boiling process of steam-boiling and heating (preliminarily heating) the brown rice discharged in the preceding tempering process (from the tempering apparatus 25), a normal-pressure steam-boiling apparatus for use can be identical to that at step 1 (the normal-pressure steam-boiling apparatus 1 at step 1, refer to FIG. 4). Therefore, description of the apparatus is omitted herein. Here, as with step 1, the process at step 5 (normal-pressure steam-boiling process) is not indispensable in the present invention. However, with this step 5 provided, production efficiency in time is improved, and uniform and high-quality product (parboiled brown rice) can be produced.

The operation of step 5 (normal-pressure steam-boiling process) is described.

At this step 5, the operation similar to that of step 1 (normal-pressure steam-boiling process) is achieved, where the brown rice discharged in the preceding tempering process is heated (preliminarily heated) with saturated vapor (in a normal-pressure state) at approximately 100 degrees Celsius for the next finish pressurized steam-boiling process. Also, in preparation for the next finish pressurized steam-boiling process, saturated steam is caused to fill the clearance between the rice grains to expel air. With this, the air between the rice grains does not provide a heat insulating operation in the finish pressurized steam-boiling process, the pressurized steam-boiling process can be efficiently performed, and nonuniformity due to pressurized steam boiling can be decreased to enhance quality. Also at this step 5, as with step 1, normal-pressure steam-boiling is preferably performed within approximately one minute.

Step 6 (Finish Pressurized Steam-Boiling Process)

At this step 6, the operation similar to that of step 2 (preliminary pressurized steam-boiling process) is achieved, where the brown rice discharged in the preceding normal-pressure steam-boiling process is alpharized for finishing. At step 6, the same pressurized steam-boiling apparatus at step 2 is used (the pressurized steam-boiling apparatus 14 at step 2, refer to FIG. 4). Therefore, description of the apparatus is omitted herein.

The operation of step 6 (finish pressurized steam-boiling process) is described.

At this step 6, the pressurized steam-boiling operation at step 2 (preliminary pressurized steam-boiling process) is performed again on the brown rice to proceed alpharization of the brown rice. In a specific operation of step 6, the brown rice preliminarily heated at step 5 (normal-pressure steam-boiling process) is supplied to the normal-pressure steam-boiling apparatus 14 for alpharization under pressurized steam-boiling conditions similar to those at step 2. As the pressurized steam-boiling conditions, the pressure in the pressurized steam-boiling apparatus 14 is adjusted to have an arbitrary set value within a range of 0.1 MPa to 0.3 MPa (the temperature at this time: approximately 120 degrees Celsius to 145 degrees Celsius), and the time for the pressurized steam-boiling process (conveyor speed of the belt conveyor 16) is adjusted to have an arbitrary set value within a range of 120 seconds to 600 seconds. With the brown rice preliminarily heated under these pressurized steam-boiling conditions is subjected to pressurized steam-boiling, the time for heating the brown rice is reduced, and the brown rice is subject to the pressured steam-boiling operation from the entire surface for a predetermined period of time to proceed alpharization. With the pressured steam-boiling operation at step 6, the degree of alpharization of the brown rice becomes approximately 80% to 90%. Here, even at step 5 (normal-pressure steam-boiling process) and step 6 (finish pressurized steam-boiling process), the amount of water for use in steam boiling is adjusted so that superfluous water can be prevented, thereby not requiring a drainage facility.

Step 7 (Cooling Process)

Figure 6:
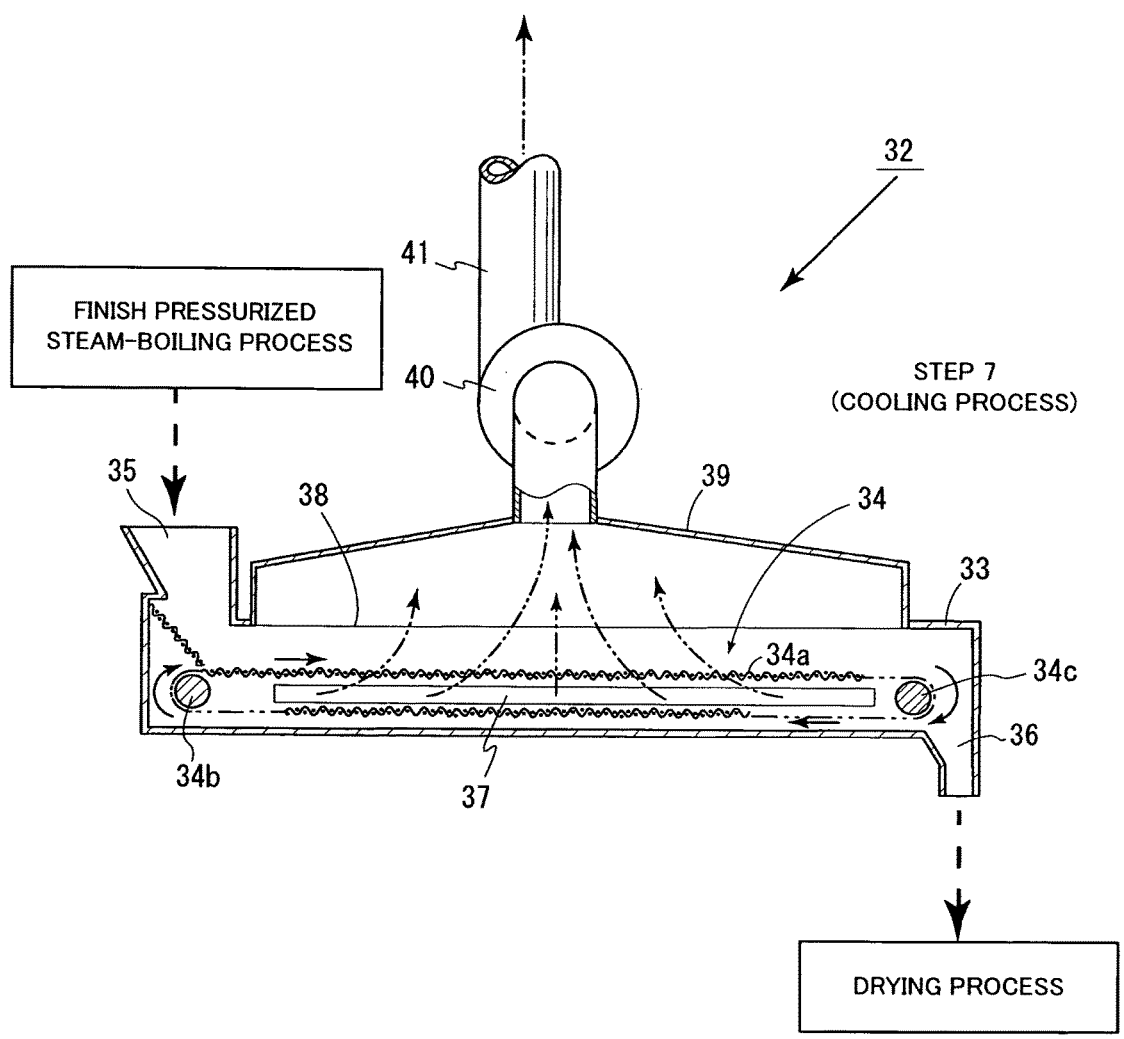
FIG. 6 is a longitudinal section view of a cooling apparatus in the present invention.

At this step 7, heat (heat just after the previous processing) on the surface of the brown rice after alpharization at the preceding process is eliminated to facilitate the next drying process. In the cooling process, a cooling apparatus 32 depicted in FIG. 6 is used. In the cooling apparatus 32, a belt conveyor 34 is disposed in a horizontal orientation inside surrounded by a machine wall 33. On an upper portion of one end of the machine wall 33, a supply section 35 is disposed for supplying the (finish-alpharized) brown rice discharged in the preceding process onto the belt conveyor 34. On a lower portion of the other end of the machine wall 33, a discharge section 36 is disposed for discharging the cooled brown rice from a conveyor termination end on the belt conveyor 34.

The belt conveyor 34 includes a net-type conveyor endless belt 34a, and a driving roller 34b and a driven roller 34c between which the conveyor endless belt 34a runs. A side part of the machine wall 33 in the cooling apparatus 32 forms an outside-air intake 37 formed in a horizontally-elongated shape along a longitudinal direction of the belt conveyor 34. Also, an upper part of the machine wall 33 is provided with a suction air-discharge port 38 approximately equivalent in size to the area of a conveyor surface of the belt conveyor 34. The suction air-discharge port 38 is connected via a suction pipe 39 and an exhaust-air fan 40 to an exhaust pipe 41.

The operation of step 7 (cooling process) is described.

At this step 7, the brown rice subjected to the preceding finish steam-boiling process (finish alpharizing process) is sequentially supplied from the supply section 35 to a conveyor start end side of the conveyor endless belt 34a. While being conveyed by the belt conveyor 34, the brown rice supplied onto the conveyor endless belt 34a receives, from below the conveyor endless belt 34a, draft of outside air taken from the outside-air intake 37 occurring due to suction of the exhaust-air fan 40, and heat (heat just after the previous processing) on the surface of the rice grains is removed to decrease the surface temperature. The brown rice is sequentially discharged from the discharge section 36. The discharged brown rice has a moisture content within a range of approximately 17% to 25%.

Step 8 (Drying Process)

Figure 7:
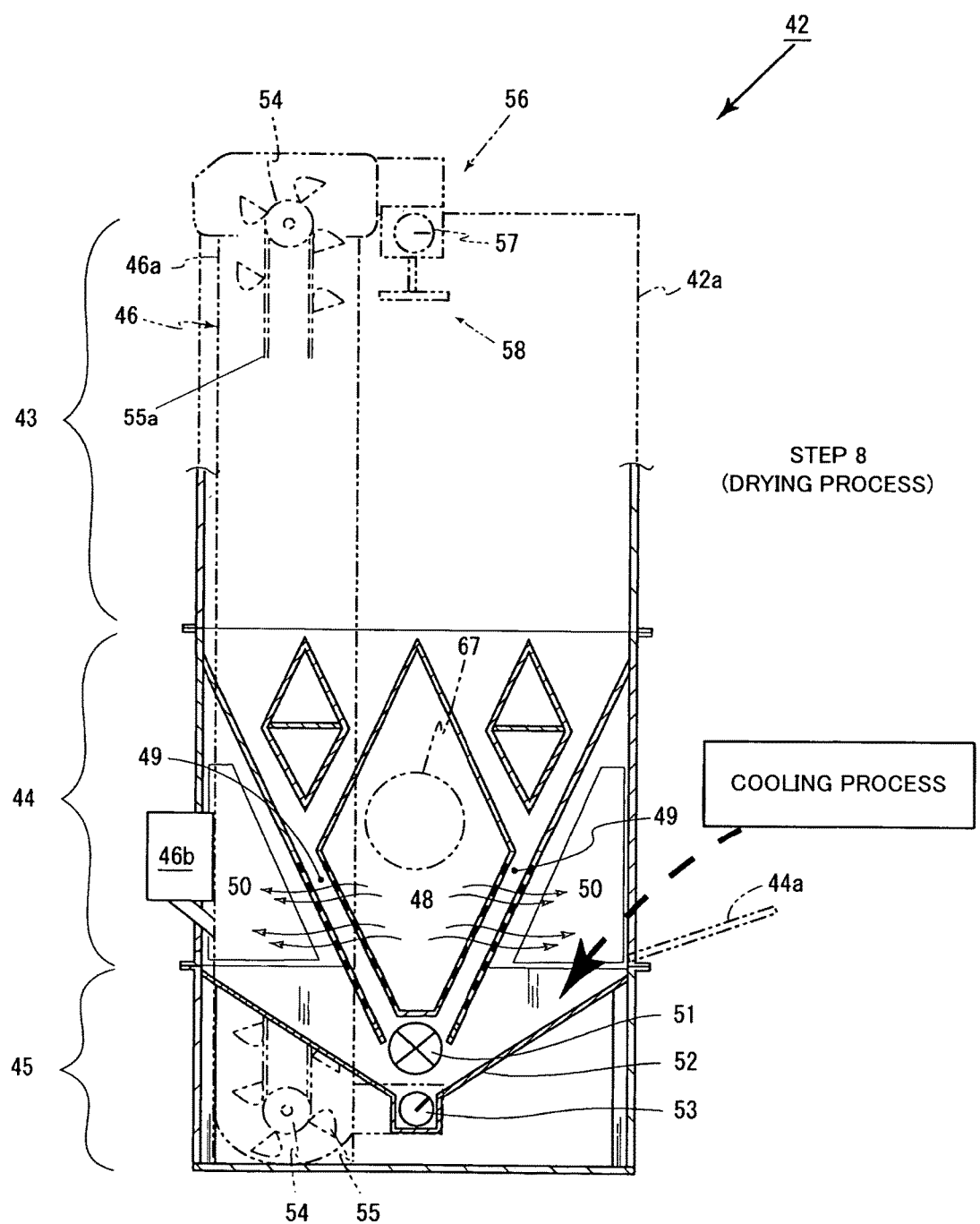
FIG. 7 is a longitudinal section view of a circular grain drying apparatus in the present invention.

In the drying process, the brown rice cooled and discharged in the preceding process is dried to have a moisture content equal to or lower than 13%. In the drying process, for example, a circular grain drying apparatus 42 depicted in FIG. 7 can be used. As the circular grain drying apparatus 42, for example, the one known and disclosed in Japanese Examined Patent Application Publication No. 8-25134 may be used. The circular grain drying apparatus 42 includes a dryer main body 42a with a reservoir section (conditioning section) 43, a drying section 44, and a discharge section 45 sequentially stacked, and a lift 46 also provided on a side of the dryer main body 42a.

The drying section 44 includes a burner 47 that generates hot air, a hot-air barrel 48 to which hot air is supplied, grain-flow lower layers 49 horizontally disposed to let hot air pass onto the grains flowing through a gap between porous plates facing each other with an arbitrary space, exhaust-air barrels 50 horizontally disposed to exhaust hot air flowing from the hot-air barrel 48 through the grain-flow lower layers 49 (between grains) to the outside, and an exhaust-air fan (not shown) communicating with the exhaust-air barrels 50 to suck the hot air for exhaustion to the outside.

The discharge section 45 includes a feed valve 51 disposed at a lower portion of the grain-flow lower layers 49, a grain collecting plate 52 in a funnel shape provided at a lower portion of the feed valve 51, and a lower conveyor screw 53, disposed at a lower portion of the grain collecting plate 52, that conveys the grains to a conveyor start end side of the lift 46.

The lift 46 has pulleys 54 disposed on upper and lower portions inside a machine frame 46a, and an endless bucket belt 55a running over the pulleys 54 and having a plurality of buckets 55 mounted thereon. One of the pulleys 54 is connected to a motor (not shown) to serve as a driving side, thereby allowing the bucket belt 55a to be transported in a vertical direction. The lower portion of the machine frame 46a communicates with a conveyor termination end side of the lower conveyor screw 53, and the upper portion of the machine frame 46a communications with a conveyor start end side of an upper conveyor section 56, which is described below. On a side of the machine frame 46a, a grain moisture meter 46b is mounted to automatically measure the moisture content of the grains being dried. The upper conveyor section 56 is disposed on an upper portion of the reservoir section 43, and includes an upper conveyor screw 57 and a dispersion plate 58 provided inside the reservoir section 43 at a position on a conveyor termination end side of the upper conveyer screw 57. On a machine wall of one of the exhaust-air barrels 50, an open/close door 44a is provided for putting and supplying the brown rice discharged in the preceding cooling process as a dried product.

This drying process (step 8) is described.

First, the open/close door 44a is opened to sequentially charge and supply one lot of brown rice discharged in the preceding process (cooling process) (moisture content: approximately 18%). The supplied brown rice is conveyed via the lower conveyor screw 53, the lift 46, and the upper conveyor section 56 to the reservoir section 43 for accumulation (this is a charging operation). When the charging operation ends, the open/close door 44a is closed to start a drying operation.

When the driving operation is started, the feed valve 51, the exhaust-air fan, the lift 46, the burner 47, and others are driven to let hot air generated by the burner 47 pass through the brown rice flowing down through the grain-flow lower layers 49 with a suction operation of the exhaust-air fan. The feed valve 51 intermittently rotates to sequentially feed brown rice from the lower portion of the grain-flow lower layers 49. The fed brown rice is caused to reflow via the lower conveyor screw 53, the lift 46, and the upper conveyor section 56 to the reservoir section 43, and then conditioning is performed in the reservoir section 43. In this manner, while the brown rice is circulating inside, the brown rice is evenly dried with hot air and conditioning repeatedly provided. Then, when the moisture content of the brown rice measured by the grain moisture meter 46b is decreased to, for example, 13%, the drying operation ends to start a discharging operation for discharging the brown rice to the outside. The brown rice dried to be at a moisture content of 13% in this manner can be stored at room temperature.

Step 9 (Finish Milling Process)

Figure 8:
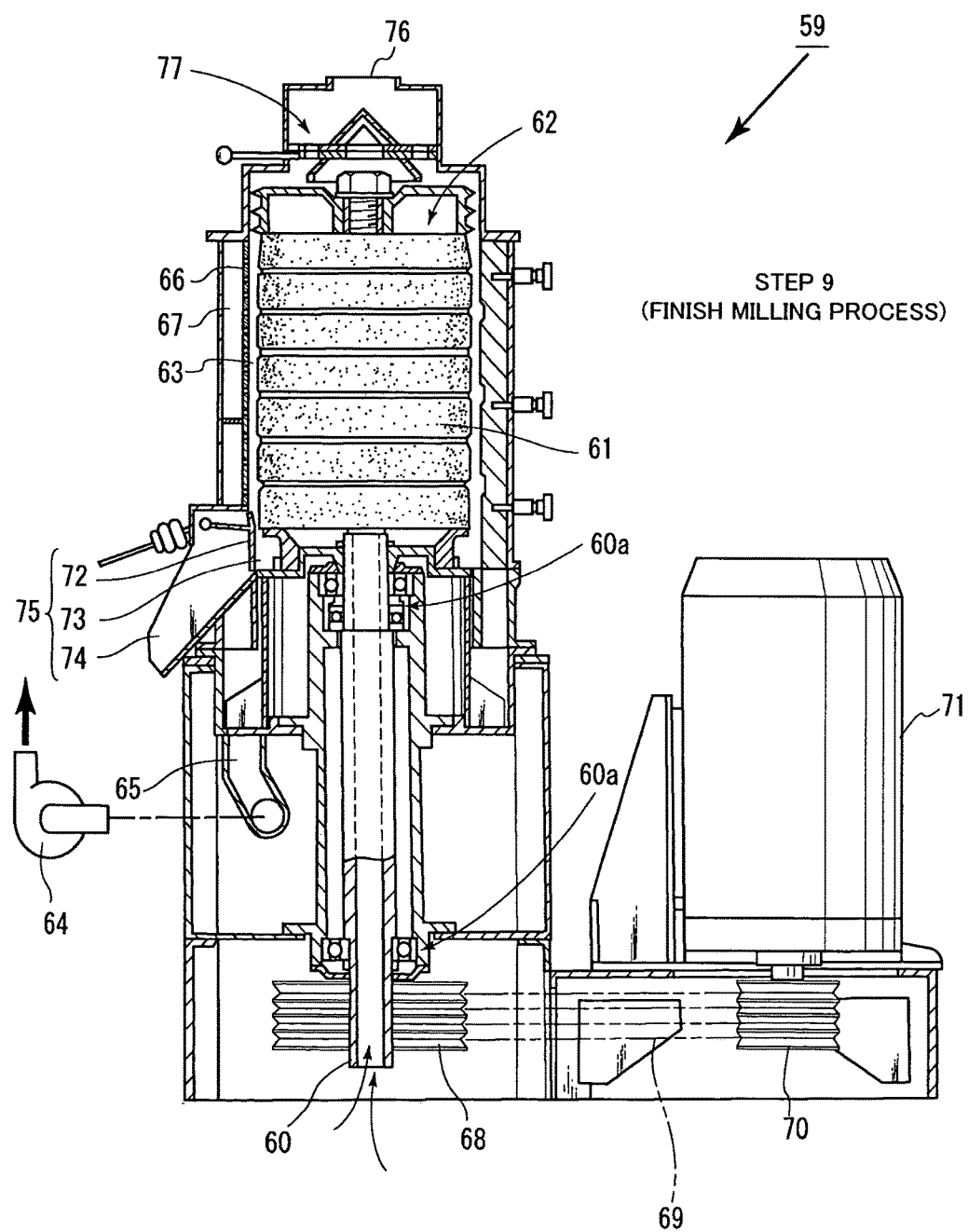
FIG. 8 is a longitudinal section view of a vertical abrasive-type milling machine for use in a first embodiment of the present invention.

In the finish milling process, the dried brown rice discharged in the preceding process is subjected to finish milling. In the finish milling process, for example, a known vertical abrasive-type milling machine 59 depicted in FIG. 8 is used. The vertical abrasive-type milling machine 59 is configured to include a milling roll 62 formed with a grinder roll 61 axially mounted on a rotary main shaft 60, a porous screen 66 disposed via a predetermined space (milling chamber) 63 in an outer perimeter direction of the milling roll 62, and a removed-bran collecting chamber 67 disposed in an outer perimeter direction of the porous screen 66. The rotary main shaft 60 is axially supported by bearings 60a disposed at arbitrary positions in a vertical direction, and has a lower end portion coupled via an axially-mounted pulley 68 and a motive power transfer belt 69 to a pulley 70 on an output side of a motor 71. With this, the rotary main shaft 60 is rotatably configured. Furthermore, on a lower end of the milling chamber 63, a product discharge section 75 is formed. The product discharge section 75 includes a resistance lid 72, a product discharge port 73, and a product discharge gutter 74.

On the other hand, an upper end of the milling chamber 63 leads to a raw material supply port 76 disposed on a further upper portion. The raw material supply port 76 is provided with a raw material supply adjusting section 77. Here, a lower end of the removed-bran collecting chamber 67 communicates with an exhaust-air fan 64 via a pipe path 65 to suck bran for discharge to the outside.

The operation of the finish milling process is described.

In the finish milling process, the motor 71 of the vertical abrasive-type milling machine 59 is first started to be driven, and settings before the start of the operation is performed by, for example, rotating the grinder roll 61 and adjusting the resistance of the production discharge section 75. Then, when the brown rice (dried at a moisture content of approximately 13%) discharged in the preceding process is supplied from the raw material supply port 76, the bran layer on the surface of the rice grains of the brown rice is gradually removed with a milling operation due to, for example, the contact with the grinder roll 61 and others while the grains flows from top to down through the milling chamber 63, to become milled rice, and the rice is discharged as a parboiled rice product from the product discharge section 75.

Step 10 (Wet-Type Polishing Process)

The wet-type polishing process may be performed as required when the outer quality (luster) of the milled rice (parboiled rice) discharged in the preceding process is desired to be further improved. In the wet-type polishing process, a known wet-type polishing apparatus is used to add a small amount of sprayed moisture to the milled rice (product) to rub the polished rice grains each other for providing a sheen. Since the wet-type polishing apparatus is known, description of a specific structure is omitted herein.

Method of Producing Instant Rice (Second Embodiment)

Figure 3:
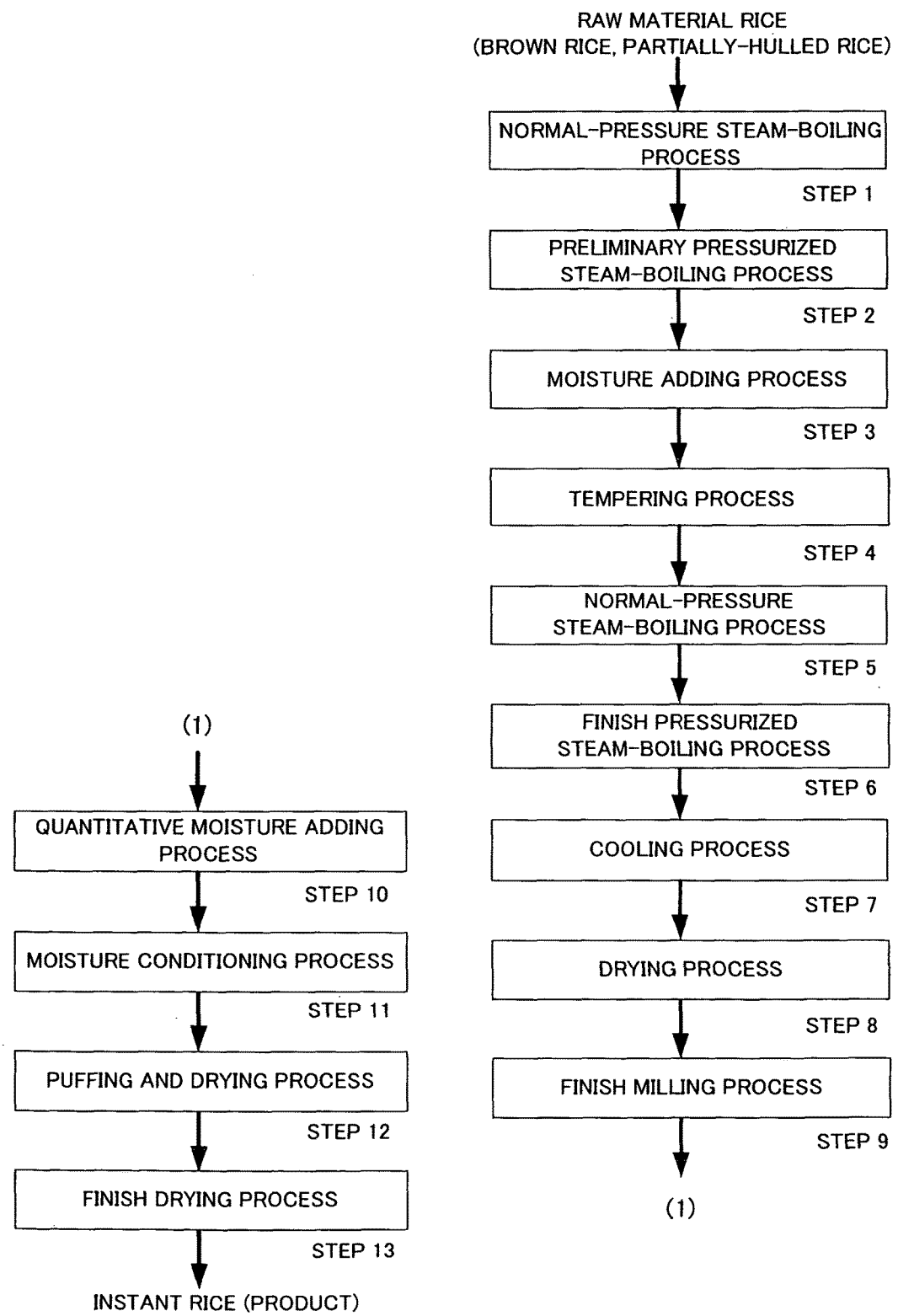
FIG. 3 is a production flowchart of a method of producing instant rice according to the present invention.

FIG. 3 is a production flowchart of a method of producing instant rice in the present embodiment.

Step 1 to step 9 are approximately similar to those in the method of producing parboiled rice described above. In the following, step 10 to step 13 unique to the method of producing instant rice is described in detail.

Step 10 (Quantitative Moisture Adding Process)

In the quantitative moisture adding process, moisture is further added to the rice grains (alpharized milled rice) discharged in the preceding finish milling process to increase the moisture content. In the quantitative moisture adding process, the same mechanical facility described at step 3 (moisture adding process) can be used. Although detailed description is omitted, with quantitative spraying of shower water from the shower spray nozzle 23a, the moisture adding process is performed until the moisture content of the rice grains becomes within a range of 40% to 55%. Here, since the surface of the rice grains has already been alpharized (95% to 100%), there is no need to worry about cracks on the surface and deformation of the shape of each rice grain.

Step 11 (Moisture Conditioning Process)

In the moisture conditioning process, as with step 4 (tempering process) described above, one lot of rice grains moisture-added in the preceding process (step 10, quantitative moisture adding process) is subjected to tempering. The time for the tempering process is set as appropriate within a range of approximately 10 minutes to 20 minutes, as with step 4. Here, the temperature in the tank section 26 is preferable within a range of 50 degrees Celsius to 70 degrees Celsius.

Step 12 (Puffing and Drying Process)

The puffing and drying process is performed on the rice grains (surface-alpharized milled rice) discharged in the preceding process with a moisture content of 40% to 55% at an overheated temperature (approximately 150 degrees Celsius to 250 degrees Celsius). In the puffing and drying process, the rice grains are puffed with overheat, thereby causing the inside of the rice grains to have a porous structure.

Figure 9:
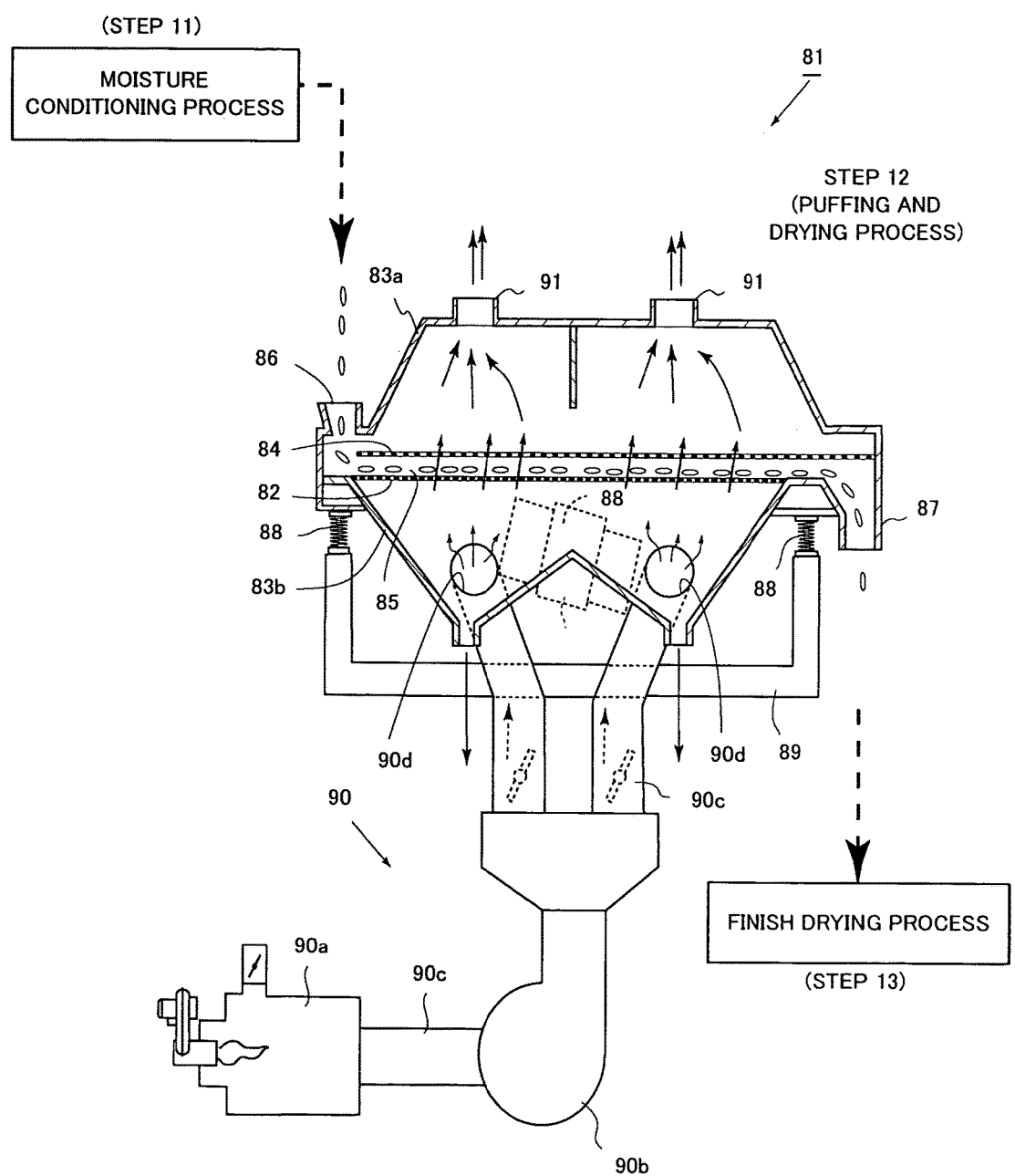
FIG. 9 is a longitudinal section view of a puffing and drying apparatus for use in a second embodiment of the present invention.

An exemplary puffing and drying apparatus 81 for the puffing and drying process is depicted in FIG. 9. The puffing and drying apparatus 81 includes a transport perforated plate 82. The transport perforated plate 82 includes many draft holes for transporting the rice grains as being dried, and is interposed between an upper machine frame 83a and a lower machine frame 83b so as to be disposed in a horizontal position. Above the transport perforated plate 82, a perforated plate 84 similar to the transport perforated plate 82 is disposed so as to face each other, and also a rice grain transport path 85 with a height allowing the rice grains to be transported is formed. On one end side of the rice grain transport path 85, a rice grain supply port 86 is disposed. On the other side thereof, a rice grain discharge port 87 is disposed. The transport perforated plate 82 (the rice grain transport path 85) can transport the rice grains with vibration from a rice grain supply port 86 side to a rice grain discharge port 87 side with a vibrating operation of a vibration motor 88 disposed on the lower machine frame 83b. The lower machine frame 83b is held by a base 89 via a plurality of springs 88.

On the other hand, a hot-air generating and supplying apparatus 90 is disposed. The hot-air generating and supplying apparatus 90 has a burner section 90a configured of kerosene burner or the like, and an air-blow fan 90b. The air-blow fan 90b is configured so as to communicate the lower machine frame 83b via a hot-air transport pipe 90c and a hot-air supply port 90d to supply hot air to a lower portion of the transport perforated plate 82. The air-blow fan 90b and the burner section 90a communicate with each other via the hot-air transport pipe 90c. The hot-air transport pipe 90c may be provided with an air-quantity adjusting valve as appropriate. The upper machine frame 83a is provided with an air discharge port 91, allowing a discharge of a draft of hot air from the lower portion of the transport perforated plate 82. To the air discharge port 91 a suction apparatus not shown may be connected. Here, at this step 12, description is made with the puffing and drying apparatus 81 as an example. Alternatively, a microwave radiating and drying apparatus may be used to achieve an object of drying rice grains at high temperatures (overheated temperature) of approximately 150 degrees Celsius to 250 degrees Celsius.

The operation of the puffing and drying process is described. In the puffing and drying apparatus 81, while being subjected a vibrating operation and transported to a downstream direction, rice grains (alpharized milled rice) with a moisture content of 40% to 55%, supplied from the rice grain supply port 86 to the transport perforated plate 82 (the rice grain transport path 85) and discharged at step 10 (moisture conditioning process), is subjected to an air draft operation of overheated hot air from below to be dried and puffed. The temperature of overheated hot air is preferably approximately 150 degrees Celsius to 250 degrees Celsius, and the time for draft of overheated hot air is preferably 10 minutes to 20 minutes. Furthermore, the moisture content of the rice grains is preferably approximately 20% to 25%.

In the puffing and drying process, the puffing process is performed by a draft operation of heated hot air, but the occurrence of cracks on the surface of the rice grains to deform the shape of the rice grains is prevented. This is because, in the processes so far, particularly the moisture adding process of step 3 is performed after the preliminary pressurized steam-boiling process of step 2 to alpharize the surface of the rice grains for stiffness, thereby allowing moisture addition without causing cracks. Furthermore, the rice grains with high stiffness on the surface after the moisture adding process are supplied to the finish pressurized steam-boiling process of step 6. Therefore, even when the surface of the rice grains is alpharized to approximately 100%, alpharization can be completed as the shape of the rice grain is kept without causing cracks in the rice grains. Still further, although the rice grains are subjected to the finish milling process at step 9, the rice grains to be milled have their surface approximately complete-alpharized, and the entire rice grains thus have high stiffness. Therefore, the shape of the rice grains is not deformed. Then, although the puffing process is performed with the draft operation with overheated hot air in the puffing and drying process in this step 12, the rice grains have their surface approximately complete-alpharized as described above, and the grains thus have high stiffness as a whole. Therefore, the puffing process can be performed without deforming the shape of the rice grains.

Step 13 (Finish Drying Process)

Figure 10:
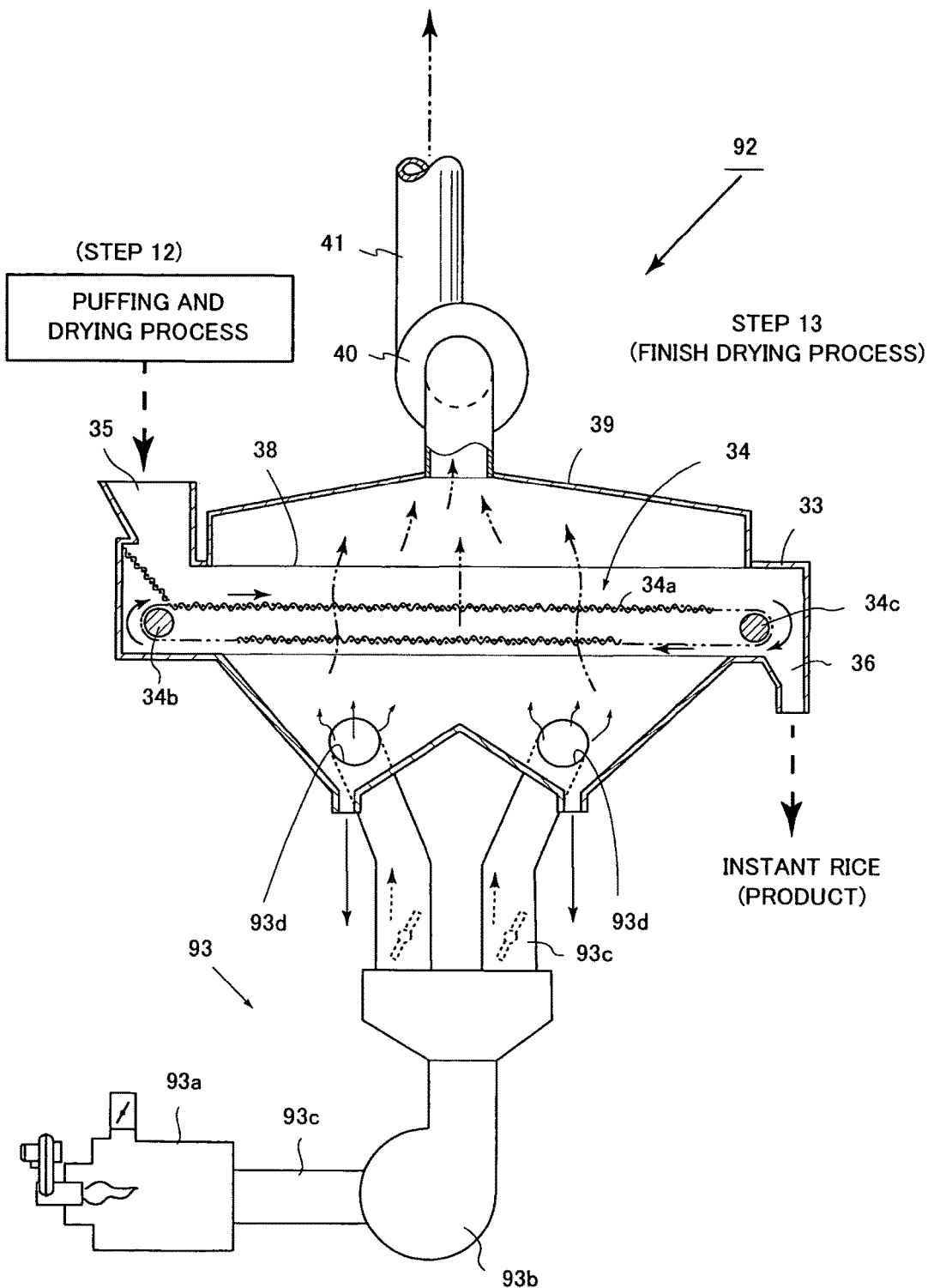
FIG. 10 is a longitudinal section view of a net drying apparatus for use in the second embodiment of the present invention.

In the finish drying process, the puffed rice grains discharged in the preceding process is finish-dried to have a moisture content equal to or lower than 12%. In the finish drying process, any known drying apparatus can be used. For example, a net drying apparatus 92 depicted in FIG. 10 can be used. The net drying apparatus 92 is obtained by improving the cooling apparatus 32 depicted in FIG. 6, capable of supplying hot air from a lower portion of the net-type conveyor endless belt 34a. That is, a hot-air generating and supplying apparatus 93 is connected to a lower portion of the main body of the net drying apparatus 92. The hot-air generating and supplying apparatus 93 includes a burner section 93a, an air-blow fan 93b, and a hot-air transport pipe 93c. Via the hot-air transport pipe 93c and a hot-air supply port 93d, a draft of hot air is supplied from the lower portion of the conveyor endless belt 34a. Here, portions identical to those in the cooling apparatus 32 are not described herein.

The operation of the finish drying process is described. In the finish drying process, the net drying apparatus 92 is used. The rice grains after the puffing process at the preceding step 12 (moisture content: approximately 20% to 25%) is supplied from the supply section 35 to a conveyor start end side of the conveyor endless belt 34a. While being supplied to the conveyor start end side by the conveyor endless belt 34a, the rice grains receives a draft of hot air at 80 degrees Celsius to 100 degrees Celsius from the hot-air generating and supplying apparatus 93 for finish drying so that the moisture content is equal to or lower than 12%, and are then discharged from the discharge section 36. Here, the hot-air draft time is preferably within 20 minutes to 30 minutes.

In the above embodiments, description is made with partially-milled rice as an example. Alternatively, the present invention can be applied to rice grains of brown rice.

As shown in the embodiments above, the present invention achieves a method of consecutively using the apparatuses at step 1 to step 13 described above to efficiently produce an instant rice product from raw material rice grains not through batch processing but consecutive processing.

In producing quick-cooking rice, the present invention can reduce the production time to improve production efficiency, and is useful as equipment without requiring a drainage facility.

The present invention is useful as equipment for producing parboiled rice and instant rice.

What is claimed is:

1. A method of producing quick-cooking rice comprising:
a first step of steam-boiling raw material rice grains at normal pressure;
a second step of steam-boiling the raw material rice grains from the first step with pressurized steam so that just a surface of the raw material rice grains is uniformly steam-boiled;
after the steam-boiling steps, adding moisture with a spraying unit to the steam-boiled rice grains, the adding comprising adding moisture to the rice grains at a moisture addition speed of 20% per hour to 80% per hour, so that a moisture content of the rice grains is 20% to 28%;
finish steam-boiling the moisture-added rice grains with pressurized steam;
drying the finish steam-boiled rice grains; and
finish-milling the dried rice grains; wherein the second step of steam-boiling is performed to reduce an occurrence of cracks in the rice grains when the moisture is added with the spraying unit.

2. The method of producing quick-cooking rice according to claim 1, wherein the second step of steam-boiling is performed with a pressurized state of 0.1 MPa to 0.3 MPa above normal pressure for 120 seconds to 300 seconds.

3. The method of producing quick-cooking rice according to claim 1, wherein the finish steam-boiling is performed with a pressurized state of 0.1 MPa to 0.3 MPa above normal pressure for 120 seconds to 600 seconds.

4. The method of producing quick-cooking rice according to claim 1, wherein in the first step raw material rice grains are heated in a rotary drum by steam at approximately 100 degrees Celsius.

5. The method of producing quick-cooking rice according to claim 1, further comprising tempering the rice grains subsequent to the adding the moisture with the spraying unit.

6. The method of producing quick-cooking rice according to claim 1, further comprising reducing heat on each surface of the rice grains discharged in the finish steam-boiling subsequent to the finish steam-boiling.

7. A method according to claim 1 wherein the raw rice grains are brown rice grains, further comprising a wet-type polishing process.

8. Parboiled rice produced with the method according to claim 7.

9. A method according to claim 1, further comprising:
adding moisture to the finish-milled rice grains;
heating and drying the moisture-added rice grains; and
further heating and drying the heated and dried rice grains.

10. A method according to claim 2, further comprising:
adding moisture to the finish-milled rice grains;
heating and drying the moisture-added rice grains; and
further heating and drying the heated and dried rice grains.

11. A method according to claim 3, further comprising:
adding moisture to the finish-milled rice grains;
heating and drying the moisture-added rice grains; and
further heating and drying the heated and dried rice grains.

12. A method according to claim 4, further comprising:
adding moisture to the finish-milled rice grains;
heating and drying the moisture-added rice grains; and
further heating and drying the heated and dried rice grains.

13. A method according to claim 5, further comprising:
adding moisture to the finish-milled rice grains;
heating and drying the rice moisture-added grains; and
further heating and drying the heated and dried rice grains.

14. A method according to claim 6, further comprising:
adding moisture to the finish-milled rice grains;
heating and drying the moisture-added rice grains; and
further heating and drying the heated and dried rice grains.

* * * * *